Kawamura

United States Patent [19]

[11] 3,767,214

[45] Oct. 23, 1973

[54] FREEZE-RESISTING SEAL RING

[75] Inventor: Toshio Kawamura, Hiratsuka-shi, Kanagawa-ken, Japan

[73] Assignee: Kabushiki Kaisha Komatsu Seisakusho, Tokyo, Japan

[22] Filed: June 17, 1971

[21] Appl. No.: 154,076

[52] U.S. Cl. .................................. 277/92, 305/11
[51] Int. Cl. ............................................ F16j 15/34
[58] Field of Search .................. 305/11, 58; 277/9, 277/42, 81, 82, 83, 92, 206

[56] References Cited
UNITED STATES PATENTS 3,241,844  3/1966  Morley.................................. 277/92
3,241,843  3/1966  Hatch et al. .......................... 277/92

Primary Examiner—Herbert F. Ross
Assistant Examiner—Robert I. Smith
Attorney—James E. Armstrong et al.

[57] ABSTRACT

A freeze-resisting seal ring adapted for use in a floating seal, distinguished by that said seal ring has a synthetic resin coating applied on its outer peripheral surface to form a water-repellent layer thereon.

4 Claims, 2 Drawing Figures

FREEZE-RESISTING SEAL RING

BRIEF EXPLANATION OF THE INVENTION

The present invention relates to a seal ring and more particularly to a pair of freeze-resisting seal rings adapted for use in a floating seal to seal bearings of upper and lower rollers, front idler and sprocket mounted on the track of various kinds of construction machines.

In the prior art, cast iron seal rings without any coating have heretofore been used, for the above purpose, and therefore the outer peripheral surfaces of said seal rings usually suffer from the deposition of any material which can readily freeze in winter season or in frigid zones. When such material deposited on the outer peripheral surfaces of seal rings in frozen, one of the pair of seal rings tends to move together with the outer upon starting the construction machines and also the sealing performance of bearing will be deteriorated until said bearing is damaged in the worst case.

The present invention has for its object to provide a seal free from the above-mentioned disadvantage, said seal ring being not frozen in winter season or in frigid zones and also capable of sealing the bearings satisfactorily.

A freeze-resisting seal ring according to the present invention is distinguished by the fact that said seal ring has a synthetic resin coating applied on its outer peripheral surface to form a water-repellent layer thereon.

DETAILED EXPLANATION OF THE INVENTION

The present invention will now be described below by way of example with reference to the accompanying drawings.

Figure 1:
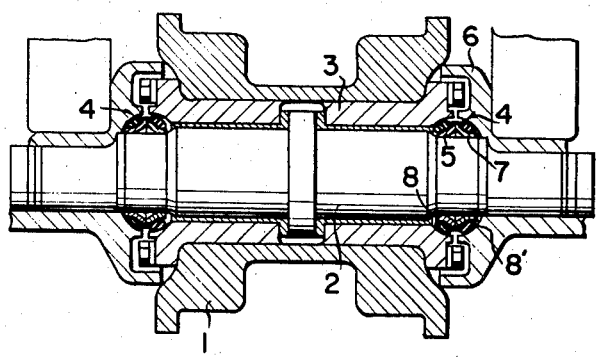
FIG. 1 is a longitudinal sectional view of the portion for supporting a shaft of a revolving wheel.

Referring to FIG. 1, a revolving wheel or lower roller 1 mounted on the track of a construction machine is rotatably carried by a shaft 2, said revolving wheel being fixedly secured to a bush 3. The shaft 2 has a pair of floating seals 4 fitted thereto near the both ends of said revolving wheel. Each of the floating seals 4 comprises, as can be seen from FIG. 2, a rotatable seal ring 5 fitted to the bush 3, said bush being interposed between the shaft 2 and the revolving wheel 1, a stationary seal ring 7 fitted to a collar 6, said collar being secured to the end portion of the shaft 2, and two separate "O" rings 8, 8' each of which being fitted over the outer peripheral surface forming a shoulder of each of the seal rings 5, 7 so as to be pressed against the bush 3 and the collar portion 6 respectively. The seal rings 5, 7 of the floating seal 4 are individual coated with a synthetic resin on their outer peripheral surfaces to form a water-repellent layer 9 thereon. In this case, it should be noted that the outer peripheral portions to which "O" rings 8, 8' are fitted respectively are not coated.

As for coating materials, water-repellent synthetic resin such as carbon fluoride resin, polyethylene resin, polypropylene resin, etc., can be preferably used. The water-repellent coating or layer 9 can be readily formed by dipping seal rings into a synthetic resin or spraying the latter on seal rings.

Figure 2:
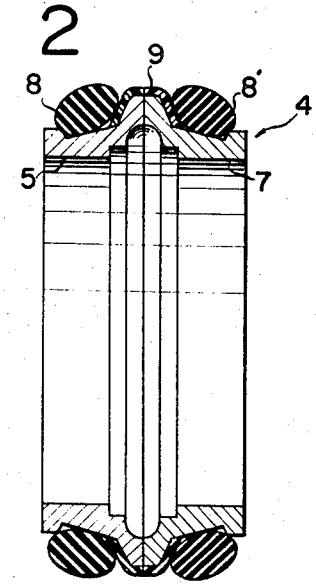
FIG. 2 is a fragmentary enlarged view of the floating seal shown in FIG. 1.

Thus, the outer peripheral surfaces of the seal rings 5, 7 with which 37 0" rings 8, 8' are not in contact are, as shown in FIG. 2, covered by a water-repellent coating or layer 9 and the covered surface is formed smoothly.

As mentioned hereinabove, according to the present invention, a pair of seal rings for use in a floating seal are individually coated with a water-repellent synthetic resin on their outer peripheral surfaces to have a water-repellent coating or layer thereon, so that any easily freezable material can be prevented from depositing to the outer peripheral surfaces of said seal rings. Therefore, said floating seal can be prevented from freezing in winter season or in frigid zones. Further, even if any easily freezable material deposited on the water-repellent coating or layer, frozen material can be easily eliminated from said seal rings upon driving the vehicle, due to the coating or layer having an excellent water-repellent property and smooth surface, whereby preventing one of the pair of seal rings from moving together with the other.

Thus, the seal rings according to the present invention can be prevented from freezing in winter season or frigid zones and also "O" rings fitted thereto can be prevented from weardown while maintaining their sealing function satisfactorily.

What is claimed is:

1. A freeze-resisting seal ring consisting essentially of a pair of seal rings having annular sealing surfaces along its one end surface and slidably disposed oppositely with each other on the sealing surface, and a water-repellent synthetic resin coating film placed on the respective outer peripheral surfaces of said seal rings wherein said resin coating film selected is from the group consisting of carbon fluoride resin, polyethylene resin and polypropylene resin.

2. A freeze-resisting seal ring according to claim 1, wherein a first seal ring is stationary and a second seal ring is rotatable relative thereto.

3. A freeze-resisting seal ring according to claim 2, wherein the stationary seal ring is fitted to a collar.

4. A freeze-resisting seal ring according to claim 3 wherein each of the rings has disposed therearound and in contacting relation, an "O" ring.

* * * * *